United States Patent [19]

Bogardus, Jr.

[11] 4,360,766
[45] Nov. 23, 1982

[54] MULTI-BATTERY POWER SUPPLY FOR DC MOTORS

[76] Inventor: Carl R. Bogardus, Jr., 3224 Lamp Post La., Oklahoma City, Okla. 73120

[21] Appl. No.: 223,104

[22] Filed: Jan. 7, 1981

Related U.S. Application Data

[63] Continuation-in-part of Ser. No. 943,757, Sep. 19, 1978, abandoned.

[51] Int. Cl.³ .............................................. H02P 1/00
[52] U.S. Cl. ...................................... 318/139; 318/440; 318/17
[58] Field of Search ..................... 318/17, 139, 440; 307/48–50, 80; 320/17, 18, 39, 40, 2, DIG. 2; 361/23, 33, 31

[56] References Cited

U.S. PATENT DOCUMENTS

| | | | |
|---|---|---|---|
| 711,667 | 10/1902 | Lundell | 318/139 |
| 1,155,170 | 9/1915 | Storer | 318/139 |
| 1,291,233 | 6/1919 | Storer | 318/139 |
| 1,607,002 | 11/1926 | Keller | 318/139 |
| 3,152,259 | 10/1964 | Heine | 361/23 X |
| 3,168,688 | 2/1965 | Roggenkamp | 318/17 |
| 3,264,540 | 8/1966 | Dannettell | 318/139 |
| 3,280,397 | 10/1966 | Bruns | 318/139 |
| 3,336,516 | 8/1967 | Kelley | 318/139 |
| 3,387,194 | 6/1968 | Banks | 318/139 |
| 3,728,599 | 4/1973 | Minami | 318/139 |
| 3,886,426 | 5/1975 | Daggett | 318/139 |
| 3,923,116 | 12/1975 | Thompson et al. | 318/139 |
| 3,991,356 | 11/1976 | Spiteri | 320/2 |

Primary Examiner—Ulysses Weldon
Attorney, Agent, or Firm—Shlesinger, Arkwright, Garvey & Dinsmore

[57] ABSTRACT

A multi-battery power supply has a battery adding circuit and a charging circuit for each battery, and a common heat sink bus.

9 Claims, 4 Drawing Figures

MULTI-BATTERY POWER SUPPLY FOR DC MOTORS

This application is a continuation-in-part of United States patent application Ser. No. 943,757, filed Sept. 19, 1978, and entitled "DC Motor Controller Circuit."

BACKGROUND OF INVENTION

This invention relates to battery power supply circuits for large DC motors, and particularly to a multi-battery supply unit with an incremental power switching circuit.

Electrically powered industrial equipment such as fork lift trucks, and vehicles such as golf carts and small automobiles require large DC motors powered by a bank of direct current batteries. These power supplies are controlled by switching circuits which bring the battery power to the motors.

These circuits have been relatively complex, required costly parts, usually were susceptible to arcing problems, and imposed a relatively large power drain on the batteries when they were in operation. This invention is directed to these problems.

SUMMARY AND FEATURES OF THE INVENTION

Accordingly, this invention provides an improved DC power supply circuit for DC motors.

A principal feature of this invention is to provide an improved power supply switching circuit for large DC motors.

Another feature of this invention is the provision of a simplified switching circuit which brings successive batteries in circuit with the motor with little power drain.

A further feature of this invention is the provision of a multi-battery circuit in which additional batteries are connected to the DC motor in smooth incremental steps over the power range.

An additional feature of this invention is the provision of a simplified diode control circuit which avoids arcing and is simpler and more versatile than previous circuits.

A further feature of the invention is the provision of an improved control circuit in which additional batteries are switched into the power supply line prior to drop-out of previous lower voltage control circuits.

A still further feature of this invention is the use of separable charging circuits for each battery permitting independent charging thereof.

A still further feature of this invention is the provision of a compact control circuit assembly in which provision is made for rapid heat dissipation through a common heat sink bus on which the diodes are mounted.

These and other features of this invention will be apparent from the following description and claims.

DESCRIPTION OF THE INVENTION

Figure 1:
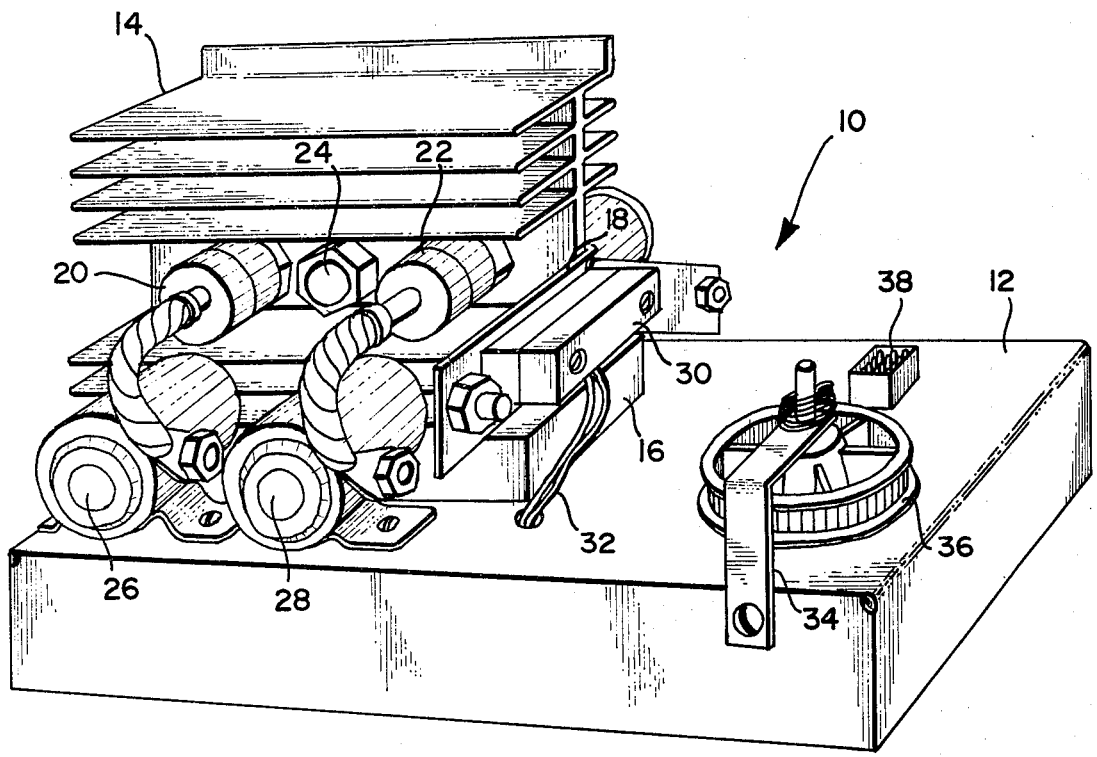
FIG. 1 is a perspective view of the power supply chassis.

Referring to FIG. 1, the control circuit chassis generally indicated at 10 has a top plate 12. The aluminum heat sink bus 14 is made of a single extruded piece of aluminum and has laterally extended finned pieces to provide heat dissipation. It is mounted on an isolating block 16, which in turn is directly mounted on the top plate 12 of chassis 10. A common bus line 18 is directly connected to the heat sink bus 14.

The current conducting diodes 20 and 22 used in the circuit are shown mounted and integrally connected to the heat sink bus 14 which directly absorbs the heat generated by them and dissipates it through its finned section. A third diode is mounted on the other side of the heat sink bus 14 and has a bolt 24 which extends therethrough and is held in position by a nut. Diodes 20 and 22 are similarly mounted.

Control relays 26 and 28 are shown mounted on the plate 12 adjacent diodes 20 and 22 and are connected electrically thereto by the cables shown.

A magnetic reed switch 30 is shown mounted on the common bus line 18, and has conductive wires which extend therefrom to control circuitry mounted beneath the chassis plate 12.

An L-shaped bracket 34 supports a rotatably mounted controller switch 36. A connector socket 38 is mounted immediately behind the controller 36.

Figure 2:
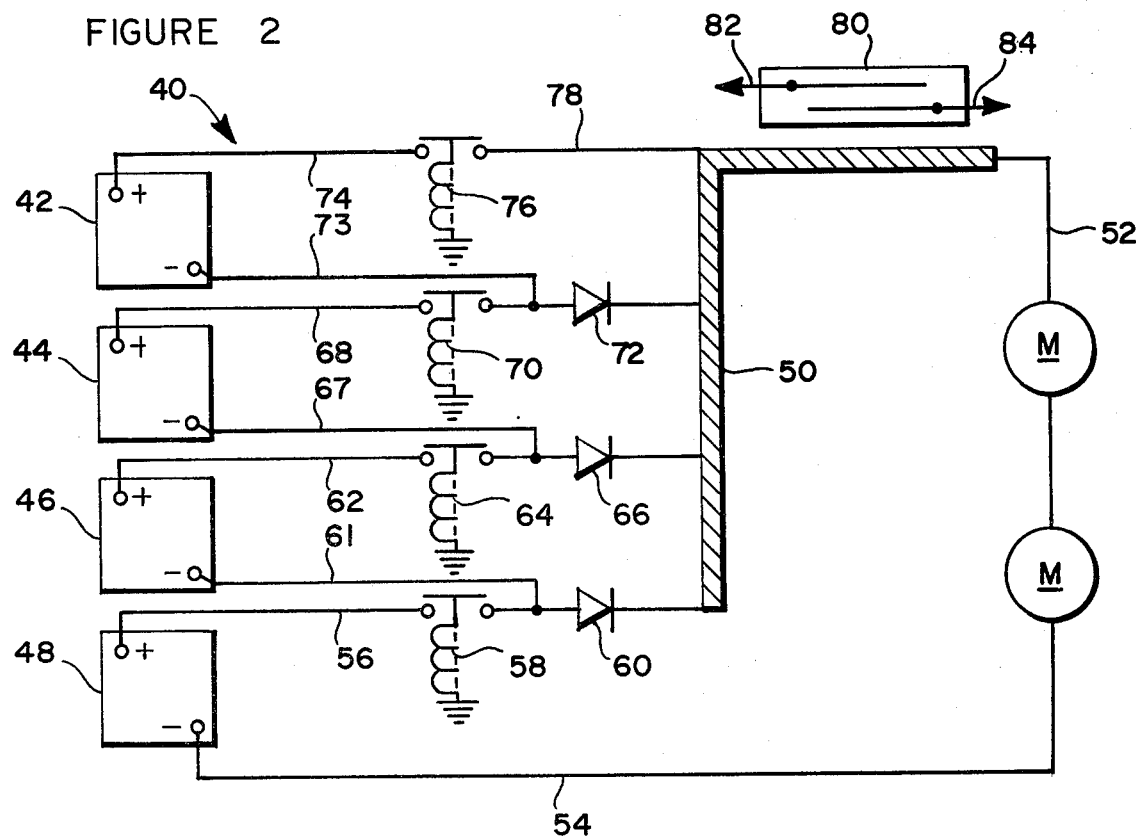
FIG. 2 is a diagram of the power supply circuit.

Referring to FIG. 2, the power supply circuit generally indicated at 40 supplies power to the two motors M schematically indicated at the right of the circuit.

The large batteries, either 12 or 24 volts each, depending upon requirement, are shown as batteries 42, 44, 46 and 48. These comprise the power supply to the motors M.

Power is supplied to the main bus 50 which is equivalent to the power bus 14 shown in FIG. 1 through which it is conducted to the line 52 and the motors M. Line 54 completes the circuit back to the multiple battery section and is connected to the negative terminal of lower battery 48.

Each of the batteries is separately connected in series with each other, each with the activation of a battery adding circuit which contains a diode and relay. The relays are controlled by a separate circuit shown in FIG. 3.

The positive terminal of battery 48 is connected to its battery adding circuit through line 56, relay 58 and diode 60. Relay 58 and diode 60 are equivalent to relay 28 and diode 22 shown in FIG. 1. The diode 60 is in direct electrical connection with the bus 50 which conducts the electrical voltage from battery 48 to the motors M through line 52.

It should be noted that on closing of relay 58, the positive terminal of battery 48 is connected to the negative terminal of battery 46 through line 61.

The battery adding circuit for battery 46 is similar to that of battery 48. The positive terminal of battery 46 is connected electrically through connecting lines 62 to the relay 64 which, when closed, provides power through diode 66 to the common bus 50. When relay 64 is closed, it should be noted that the batteries 46 and 48 are connected in series, and the diode 60 drops out of the conducting circuit.

Similarly, if additional power is required, battery 44 can be connected to the power bus 50 through its battery adding circuit which includes connecting line 68 connected to its positive terminal, the remotely actuated relays 70, and diode 72. When relay 70 is actuated, all three batteries, namely batteries 44, 46 and 48 are connected in series and the positive side of the series connected batteries at the positive terminal of battery 44 is directly connected through diode 72 to the heat sink bus 50. The relays 58, 64, and 70 all remain closed with the current flowing across their closed contacts, while diodes 66 and 60 cease conducting and the negative terminal battery 42 is connected to the positive terminal of battery 44 through lines 68 and 73.

To place all four batteries in series to produce maximum power output, relay 76 is actuated to connect the positive terminal of battery 42 directly to the heat sink bus 50 through lines 74 and 78. It will be noted that at maximum power, all three diodes are dropped out of the circuit.

A magnetic reed switch 80, corresponding to the reed switch 30 in FIG. 1, is positioned near the power bus and has output leads 82 and 84. The reed switch is part of an interlock circuit shown and described in the control circuit of FIG. 3.

Figure 3:
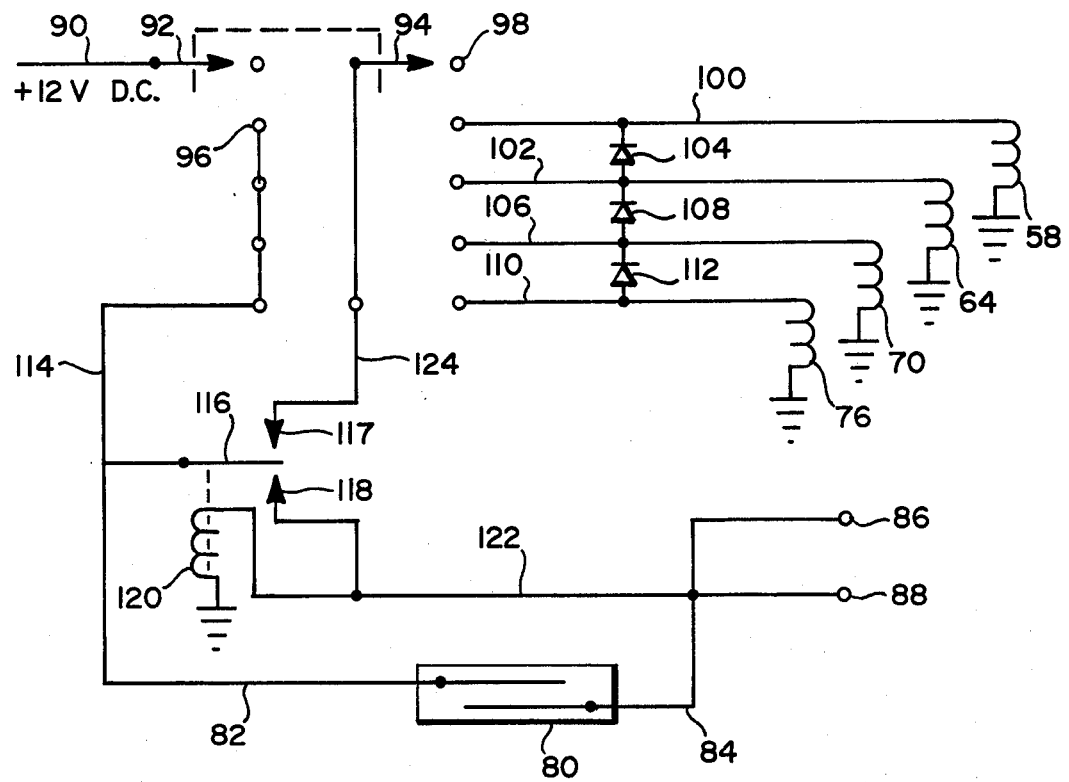
FIG. 3 is a diagram of the common control circuit.

The control circuit for the unit is shown in FIG. 3 which is connected to a positive 12 volt DC supply line 90. The reed switch 80 is connected through line 84 to a brake light switch terminal 86 and a battery charger terminal 88. Both are 12 volt sources also.

A two pole four position with off slide switch having arms 92 and 94 is connected to the input 12 volt positive DC line 90. Arm 94 is shown in the off position adjacent the contact 98. When the switch is moved such that arm 92 engages contact 96 and the interconnected contacts, arm 94 is moved into contact with line 100 to supply DC voltage to the coil of relay 58, the connecting relay switch for the first battery to be connected to the common connecting bus 50 of FIG. 2.

When the arm 94 is moved to contact line 102 sending current to that line rather than line 100, the coil of relay 64 is activated. In addition, power flows through the diode 104 to supply power to line 100 to maintain the coil of relay 58 in a closed position. Referring to FIG. 2, it will be seen that this will connect battery 46 in circuit with the motors, inasmuch as relays 58 and 64 are both activated simultaneously providing a direct seris connection for the two batteries which are also directly connected across the common power supply bus 50 and the output line 54 from the motors.

The arm 94 when moved to the contact connected to line 106 activates the coil of relay 70 and provides a parallel power path through diode 108 to supply current to the coils of relays 58 and 64. Similarly, when the contact arm 94 is moved to the contact of line 110, power is supplied to the coil of relay 76 (the uppermost and final relay shown in FIG. 2). Power is supplied through diode 112 to line 106, and to lines 102 and 100 through diodes 108 and 104, respectively, so that all four relays are maintained in closed position.

The power to arm 94 is supplied along line 96 and the contact line 92 and along line 114 and through conducting arm 116 of the interlock relay which has contacts 117 and 118. The interlock relay is maintained with the conducting arm 116 in contact with the contact 117 so that power is supplied through line 124 to the arm 94 of the control switch.

The interlock relay is a safety mechanism which prevents flow of current through the switch activating lines when any one of three conditions occur.

The interlock relay has a coil 120 which when supplied with power from line 122 pulls contact arm 116 down into engagement with the contact 118. When this occurs, 12 volt current is supplied through the coil 120 through line 122 to maintain it in a permanent disconnected condition.

The interlock relay serves as a safety circuit, shutting down power supplied to the motor control circuit and disconnecting power supplied through the power adding circuits from the batteries to the motors. When the brakes are applied power is supplied to contact 86 from the brake light switch which is a 12 volt supply, to activate the interlock relay coil 120. Similarly, if the batteries are being charged through the battery charger circuit, shown hereafter and described in FIG. 4, 12 volts will be applied to the contact 88 and supplied through line 122 to the interlock relay coil 120.

Also, to prevent overload, the magnetic reed switch 80 which is placed adjacent the common power supply bus 50 of FIG. 3 is activated when too much current flows through the bus. This closes the contacts in the reed switch connecting the line 82 which has a 12 volt potential to line 84 and line 122, providing current to the coil 120 to activate the interlock relay.

The interlock circuit is reset when the control switch arms 92 and 94 are returned to the off position, cutting off application of the 12 volt supply through lines 144 to the interlock relay coil 120.

Figure 4:
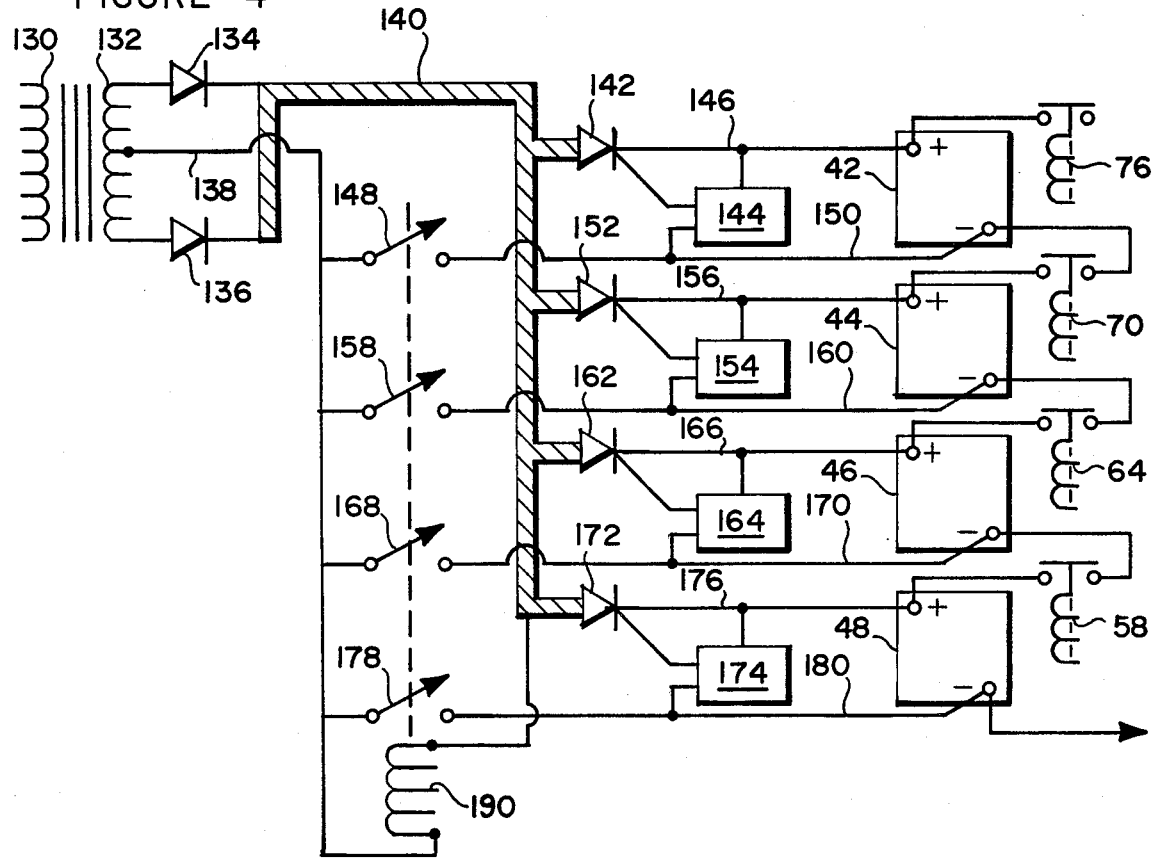
FIG. 4 is the circuit for the separable recharging for the batteries of FIG. 2.

The recharging circuit for the batteries is shown in FIG. 4. It is permanently connected to the batteries 42, 44, 46, and 48, as a permanent part of the circuit.

A transformer having a primary coil 130 and secondary coils 132 forms a DC voltage recharging source with diodes 134 and 136 and center tap 138.

The output through the diodes is connected to the central bus 140 and silicon controlled rectifier 142 to battery 42 through conductor 146. Regulator 144 senses the voltage potential across lines 146 and 150. Switch arm 148 is closed to complete the electrical connection and commence charging. The regulator controls the output from the silicon controlled rectifier 142 and blocks further current supplied to the battery 42 along line 146 when the battery is fully charged.

The battery charging circuits for battery 44 include the silicon controlled rectifier 152, line 156 connected to the positive terminal, line 160 connected to the negative terminal and switch arm 158. When the switch arm 158 is closed, the regulator 154 senses the potential difference between the battery terminal lines and shuts off the silicon controlled rectifier when the battery is fully charged. It will be noted that each of the charging circuits act independently from the other with its regulator only being responsive to the voltage across the battery terminal input lines.

Similarly, the battery charging circuit for battery 46 includes silicon controlled rectifier 162, its regulator 164, input line 166, switch arm 168 and negative terminal connecting line 170. This charging circuit acts in the same manner as the charging circuits for batteries 42 and 44 and is independent of them.

The battery charging circuit for battery 48 includes silicon controlled rectifier 172, its regulator 174, connecting line 176, switch arm 178 and negative terminal connecting line 180.

All of the switch arms are closed simultaneously when the coil 190 is activated.

OPERATION

FIG. 1 shows in perspective chassis 10 which contains the circuits of FIGS. 2 and 3 in a compact self-contained, readily installed package. The finned heat sink and common bus 14 provide an essential cooling function, as well as providing conducting and mounting capability for the three diodes of the battery adding circuits, two of which are shown at 20 and 22. The finned conductor is isolated electrically from the chassis by the isolating block 16. It permits effective forced air cooling of the diodes. All three diodes which are schematically shown in FIG. 2 as diodes 60, 66 and 72 are compactly mounted and effectively cooled in this manner.

The four control relays are mounted two on each side of the common bus finned conductor 14, two of which are shown at 26 and 28. The conducting line between the battery isolating diodes and the control relay are shown, but the battery connecting cables are omitted from FIG. 1.

The observable portion of the controller switch 36 is shown, with the remaining portion disposed on the underside of the chassis top plate 12. It is operated by a cable attached to the portion shown which is pulled on depression of the accelerator pedal in turn rotating the wheel to move the switch to the desired position.

The magnetic reed switch is directly mounted on the main conducting bus 18 which is the main feed line to the motors and is represented by line 52 in FIG. 2. If too much power is transmitted through the bus threatening to possibly damage the motors, the magnetic reed switch is closed to disconnect the batteries from the circuit with the motors.

Referring to the circuits of FIGS. 2 and 3, depression of the accelerator pedal moves the control switch arms 92 and 94 from the off position to the successive taps shown in FIG. 3 in which control voltage is supplied from the 12 volt source along the line 90 through the arm 92 and connector taps at 96 through the interlock relay arm 116 to the conductors 100, 102, 106, and 110 which supply power to the coils of the control relays. As mentioned above, diodes 104, 108, and 112 of FIG. 3 supply current to keep previously activated relays in the closed position.

As each successive battery adding circuit is activated by its control relay, as for example the battery adding circuit of FIG. 2 containing relay 64, its diode, in this instance, battery blocking diode 66 conducts, while the diode of the previously activated line, which in this instance would be diode 60, drops out of the circuit. This condition would be represented by the switch arm 94 being in electrical connection with line 102 supplying 12 volts to the relay coil 64. Batteries 46 and 48 would be maintained in series connection by relay 58 which would be held in closed position due to the current flow through diode 104 and line 100 to the coil of that relay.

All four of the batteries of FIG. 2 will be connected in series when the arm 94 of the switch is in contact with line 110 of FIG. 2 such that relay 76 is closed as well as relays 58, 64 and 70. Battery 42 of FIG. 2 in this case will be directly connected to line 74 and relay 76 to the common conducting bus 50. Note that line 78 has no diode, so that there is no power loss across the diode when full power is required.

Overload protection is provided by the magnetic reed switch 80 of FIG. 2. The operation of the reed switch is shown in the circuit of FIG. 3. When the contacts are closed the 12 volt DC supply from the line 90 passes through arm 92 and contacts 96 along line 114 and line 82 through the switch and line 84 to line 122 which is directly connected to the interlocking relay coil 120. When the interlocking relay is activated by application of power to the coil 120, the arm 116 is pulled away from contact 117 to contact 118. This disconnects the 12 volt DC from the line 124 and interrupts power supplied to the control relay coils. This disconnects the power supply batteries from their connection to the common supply bus 50. Simultaneously, 12 volts DC is supplied through arm 116 to contact 118 and line 122 thereby supplying continuous current to the interlocking relay coil 120 to hold it in an interlocked power off position until the switch arm 92 is returned to the off position as shown in FIG. 3.

As mentioned above, the interlock relay also shuts down power when a 12 volt input is received at terminal 86 from the brake light switch, so that the motor power is disconnected when the brakes are applied.

The interlock relay also cuts off power to the motors in the third instance, namely, when the batteries are being charged. Terminal 88 is connected to the 12 volt DC supply input from the battery charger circuit. In this instance also, the batteries are disconnected and kept out of circuit until the controller switch is moved to the off position to reset the circuit.

It should be noted that the batteries of FIG. 2 are each separately connected, and are not connected in series until that battery is required for power supply to the motor. This provides a safety feature to the circuit by preventing a large cumulative total voltage across the batteries until the circuit is providing full power to the motors under ordinary operating conditions.

It also permits the use of a much simpler charging circuit for the battery, as shown in FIG. 4.

The charging circuit of FIG. 4 provides for parallel simultaneous and independent charging of the batteries of FIG. 2 with an individual charging circuit across the positive and negative terminals of each battery. It is possible to use a single common transformer with diode rectification and a common supply bus 140 for all charging circuits. When the multiple switch relay coil 190 is activated all four arms 148, 158, 168 and 178 close to complete the line connections to the battery. The supply lines 146, 156, 166, and 176 to the four batteries shown each has a silicon controlled rectifier. The silicon controlled rectifiers, such as SCR 142 are biased to permit current flow through them under ordinary charging conditions by the regulator 144. However, when the battery becomes fully charged, the regulator 144 will shut down flow of current through the SCR 142. Each battery is individually charged by its own individual battery charging circuit. This multiple charging circuit permits all batteries to be charged simultaneously, with each charging circuit being cut out when its corresponding battery reaches a full charge. This is an important capability for the circuit, allowing charge of all of the batteries irrespective of their state of charge. In such a circuit there invariably is an uneven drain on the batteries since the first batteries used at the lower speeds more will have been drained than the batteries used only at the higher speeds.

With the charging circuit included as a permanent part of the power supply circuit, it is only necessary to plug in the single transformer to an alternating current source to recharge the batteries.

This battery circuit is more effective, less complex, and substantially more economical than other types of circuits used to provide power for large DC motors.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall with the scope of the invention or the limits of the appended claims.

What I claim is:

1. A power supply circuit for large DC motors, comprising:
    (a) a plurality of large DC batteries each battery having two terminals including a positive and a negative terminal,
    (b) a common power bus adapted to be connected to a large DC motor, and to which the batteries are successively connected depending upon power requirements,
    (c) a plurality of battery-adding circuits wherein one of said battery adding-circuits is connected between one terminal of the same polarity of each battery and the power bus,
    (d) the battery-adding circuits each containing a battery current diode connected to the power bus and a normally open electrical switch connected between the said one terminal and the said diode, a connecting line coupling the diode and said electrical switch to the other terminal of the next succeeding battery to be connected in circuit with the motor,
    (e) remotely controlled electrical actuating means connected to the electrical switch of each battery-adding circuit for successively connecting the large DC batteries to the power bus and retaining previously connected batteries in circuit with the power bus,
    (f) all of the normally open electrical switches isolating its respective battery from the power bus when not closed by the remotely controlled electrical actuating means, and
    (g) a separate battery recharging circuit connected to each battery for providing independent simultaneous charging thereof.

2. A power supply circuit for successively connecting a plurality of electrically isolated batteries in a series connection with a DC motor, comprising:
    (a) a plurality of large DC batteries for providing power to a DC motor, each DC battery having two terminals including a positive and a negative terminal,
    (b) a common power bus adapted to be electrically connected to a DC motor,
    (c) each DC battery having a battery-adding circuit connected between cne of the two terminals and the common power bus for placing the battery in series with the DC motor,
    (d) each battery-adding circuit having a blocking diode directly connected to the common power bus and an electrically controllable normally-open battery-adding switch connected between the diode and one of the two terminals,
    (e) a connecting line connected at one end of the battery-adding circuit between the blocking diode and the battery-adding switch, and at the other end to the terminal of the next battery to be connected in series with the DC motor which is of opposite polarity from said one of the two terminals,
    (f) common electrical control means electrically connected to all of the normally open battery-adding switches of the battery-adding circuits for successively closing the battery-adding switch in the battery-adding circuit for each successive battery to be placed in series with the DC motor,
    (g) the common electrical control means including a single spaced electrical switch element for each battery-adding switch,
    (h) a control line connected between each electrical switch element and the battery-adding switch to which it is connected,
    (i) the switch elements being positioned in spaced relationship from each other and with respect to a single operator controlled device to provide for successive closing of the battery-adding switches as desired by the operator,
    (j) the control lines being interconnected electrically to keep successive earlier activated battery-adding switches closed, and
    (k) all of the normally open battery-adding switches being normally open when they are not connected in circuit with the motor so that when no power is being supplied to the motor the batteries are electrically isolated from each other.

3. The power supply circuit for large DC motors as set forth in claim 2 wherein:
    (a) the common power supply bus is a large metallic heat sink bus, and the diodes of the battery adding circuits are mounted thereon.

4. The power supply circuit for large DC motors, as set forth in claim 2, wherein:
    (a) a separate automatically controlled recharging circuit is connected to each of the large DC batteries for providing independent, simultaneous charging of all DC batteries.

5. The power supply circuit for large DC motors, as set forth in claims 2 or 3, wherein:
    (a) emergency circuit cut off means is connected in circuit with the common electrical control means connected to all batteries for cutting off all battery power supplied to the common power bus.

6. The power supply circuit for large DC motors, as set forth in claims 2, 3, or 9, wherein:
    (a) the common power bus is a large metal conductor bus,
    (b) a current sensitive overload sensing element is disposed adjacent the conductor bus, and
    (c) emergency circuit cut off means is connected in circuit with the sensing element and the common electrical control means connected to all batteries for cutting off all battery power supplied to the common power bus.

7. The power supply circuit for large DC motors, as set forth in claims 2 or 3, wherein:
    (a) emergency circuit cut off means is connected in circuit with the common electrical control means for cutting off all battery power, and
    (b) an interlocking relay circuit is contained in the emergency circuit cut off means for preventing the batteries from being connected to the common power supply line until an interlock relay is reset.

8. The power supply circuit for large DC motors, as set forth in claims 4 or 1, wherein:
    (a) each separate battery recharging circuit has a line connected to the positive terminal and another line to the negative terminal of the battery,
    (b) a silicon controlled rectifier is contained in the line connected to the positive terminal of the battery, and
    (c) battery charge regulating means is connected across the lines and to the silicon controlled rectifier for controlling its output.

9. The power supply circuit for large DC motors a set forth in claim 3, wherein:
    (a) the metallic heat sink bus has large cooling fins to expedite cooling.

* * * * *